United States Patent [19]
Frank

[11] 3,856,499
[45] Dec. 24, 1974

[54] SHAPING HEAT-SOFTENED GLASS SHEETS BY ROLL FORMING

[75] Inventor: Robert G. Frank, Murrysville, Pa.

[73] Assignee: PPG Industries, Inc., Pittsburgh, Pa.

[22] Filed: June 20, 1973

[21] Appl. No.: 371,920

[52] U.S. Cl. .................................. 65/104, 65/106
[51] Int. Cl. ............................................ C03b 23/02
[58] Field of Search ............. 65/104, 106, 107, 245, 65/253, 273, 286; 264/175, 185

[56] References Cited
UNITED STATES PATENTS
3,701,644 10/1972 Frank................................. 65/273 X Primary Examiner—Arthur D. Kellogg
Attorney, Agent, or Firm—Edward I. Mates; Thomas F. Shanahan

[57] ABSTRACT

A method of shaping a deformable sheet by roll forming which includes the steps of applying a bending force with a pair of opposed sets of complementary shaping rolls to initially shape the sheet into proximate conformity with the shaping surfaces of said rolls, discontinuing the application of said bending force before the rolls are in complete surface-to-surface contact with the sheet and permitting the sheet to sag bend into further conformity with the lower of said opposed sets of shaping rolls.

5 Claims, 8 Drawing Figures

SHAPING HEAT-SOFTENED GLASS SHEETS BY ROLL FORMING

BACKGROUND OF THE INVENTION

The present invention relates to shaping glass sheets, and particularly concerns a method and apparatus for shaping a series of glass sheets by the roll forming method. According to the roll forming method, a series of heat-softened glass sheets is conveyed between an upper set and a lower set of shaping rolls of complementary shape. Each set is carried by a movable roll housing. When each glass sheet reaches a position between the sets of shaping rolls, at least one of the sets moves relative to the other set into a sheet engaging position for sufficient time for the shape of the rolls to be impressed on the glass sheet as the latter passes between the sets of shaping rolls. The sets are separated and the shaped glass sheet proceeds to a cooling or quenching station where the glass sheet is cooled to impart either a partial or full temper or an anneal depending on the rate of cooling. When the next heat-softened glass sheet in the series arrives between said sets, the sets are again moved relative to one another to their sheet engaging position. Such continuous sheet movement has resulted in increasing the rate of production of shaped glass sheets.

Prior to the development of the roll forming method, horizontally disposed glass sheets had been bent to shape on a mass production method by moving a series of glass sheets through a furnace and stopping the movement of each sheet in turn when the latter was aligned between a pair of shaping members, as in U.S. Pat. No. 3,374,080 to Robert W. Wheeler or in U.S. Pat. No. 3,468,645 to Harold A. McMaster et al. Furthermore, glass has also been press bent to a desired shape one sheet at a time, as evidenced by U.S. Pat. No. 3,414,395 to Thomas J. Reese and Russell J. Corsi. However, the latter method is not adapted for use in high speed production and is used primarily to produce massive glass shapes weighing hundreds of pounds and more.

The need for curved glass sheets has increased tremendously in recent years, particularly with the increase in use of curved glass for windshields, sidelights and rear windows of automobiles. The problem of increasing the rate of production of shaped glass sheets on a mass production liner has been recognized and new methods and apparatus that do not necessarily require glass sheets to be stopped at a shaping station have been developed, as is evidenced by U.S. Pat. No. 3,545,951 to Maurice Nedelec and U.S. Pat. No. 3,701,644 to Robert G. Frank. These patents illustrate different apparatus for shaping continuously moving glass sheets by the so called roll forming method.

The Nedelec patented apparatus has capabilities of shaping glass sheets to a limited family of shapes about one axis only to curves that do not change configuration from end to end of the sheets along the path of glass sheet movement through the roll forming apparatus. The Frank patented apparatus is also capable of producing similar bends about a single axis of bending and, in addition, can produce compound bends comprising bends about two mutually perpendicular axes or bends whose radii of curvature vary from portion to portion of the bent sheets along the path of sheet movement through the roll forming apparatus. From time to time, the roll forming apparatus of the prior art has produced shaped sheets having surface marks. Such marks impair the optical properties of the glass sheets, sometimes to such an extent as to make them unsuitable for commercial use.

The present invention makes it possible to reduce the severity and frequency of surface optical defects associated with prior art roll forming apparatus to such an extent that the resulting articles are acceptable to the customer for both curvature and optical properties. At the same time, the present invention makes it possible to retain the benefits of the high rate of production that characterizes roll forming operations.

SUMMARY OF THE INVENTION

While it is understood that the present invention is suitable to shape deformable sheets of any composition, it will be described in terms of shaping glass sheets by the roll forming method because optical properties of shaped glass sheets are very critical.

The present invention makes it possible to reduce both the severity and the frequency of roll marking defects attributed to roll forming by applying bending force through rolling contact against a portion only of a first surface of a glass sheet to be shaped while applying simultaneous rolling contact against a portion only of the opposite surface that is offset from the contacted portion of the first surface before the sheet cools to below its deformation temperature. The rolling contact provided against opposite sheet surfaces is controlled to minimize simultaneous contact of aligned portions of said opposite surfaces by opposing corresponding shaping rolls. The closest distance corresponding shaping rolls of one set may approach a corresponding roll of the other set is greater than the thickness of glass sheets being treated. This allows certain glass sheet portions intermediate edge portions engaged by one set and center portions engaged by the other set to sag to the lower set before the are engaged by the upper set. The sheet moves continuously between the sets during the roll forming process.

In order to assure that the roll forming apparatus as modified by the present invention does not produce glass sheets whose configuration deviates to a greater degree than acceptable to the customers, provision is made to limit the spacing between corresponding shaping rolls of the opposite sets to a maximum not exceeding the total of the glass sheet thickness plus the deviation in shape allowed by the customer. As a practical matter, the roll forming apparatus is adjusted so that the minimum spacing between corresponding shaping rolls of the relatively movable sets is less than said total but greater than the thickness of glass sheets treated.

The present invention is designed specifically to produce shaped glass sheets with a minimum of optical defects and free of deviations in shape so great as to be unacceptable in commerce. The apparatus aspect of the present invention involves the incorporation of adjustable stop means associated with at least one of the shaping roll housings to control the position of the sets of shaping rolls in the glass engaging position. Means are provided for adjusting the stop means in position to compensate for a change in thickness of glass sheets that are shaped by the roll forming apparatus.

Glass sheets arrive at a shaping station in a deformable state. They are usually heated to their deformation temperature within a furnace and when they reach a plenum chamber to the upper surface of the wall. Each delivery passageway is surrounded by a series of escape ports of larger circular cross-section as depicted in U.S. Pat. No. 3,455,669 to Harold E. McMaster et al. in this alternative gaseous hearth construction.

In the gas hearth furnace, glass sheets are supported by a thin gaseous bed in an oblique plane and are engaged along their lower side edges only by means of a series of rotating driving discs 206 disposed in a series along the lower side edge of the gas hearth bed. The discs rotate in unison to propel a series of glass sheets along the length of the gas hearth bed toward the roll pressing station 24. The discs 206 are driven in unison by drive shafts 207. The latter in turn are driven through spur gears 209 by a main drive shaft 210. Electrical resistance heaters 212 are provided in the roof of the heating furnace 20 to irradiate heat against the upper surface of each sheet while its lower surface is both heated and supported by the hot gases applied through the modules against said lower surface.

The conveyor rolls 25 of the roll forming station 21 are disposed to form an upper common tangential plane which is an extension of the oblique plane of support provided by the gas hearth bed formed by the gas applied through the array of modules in the furnace 20.

Figure 1:
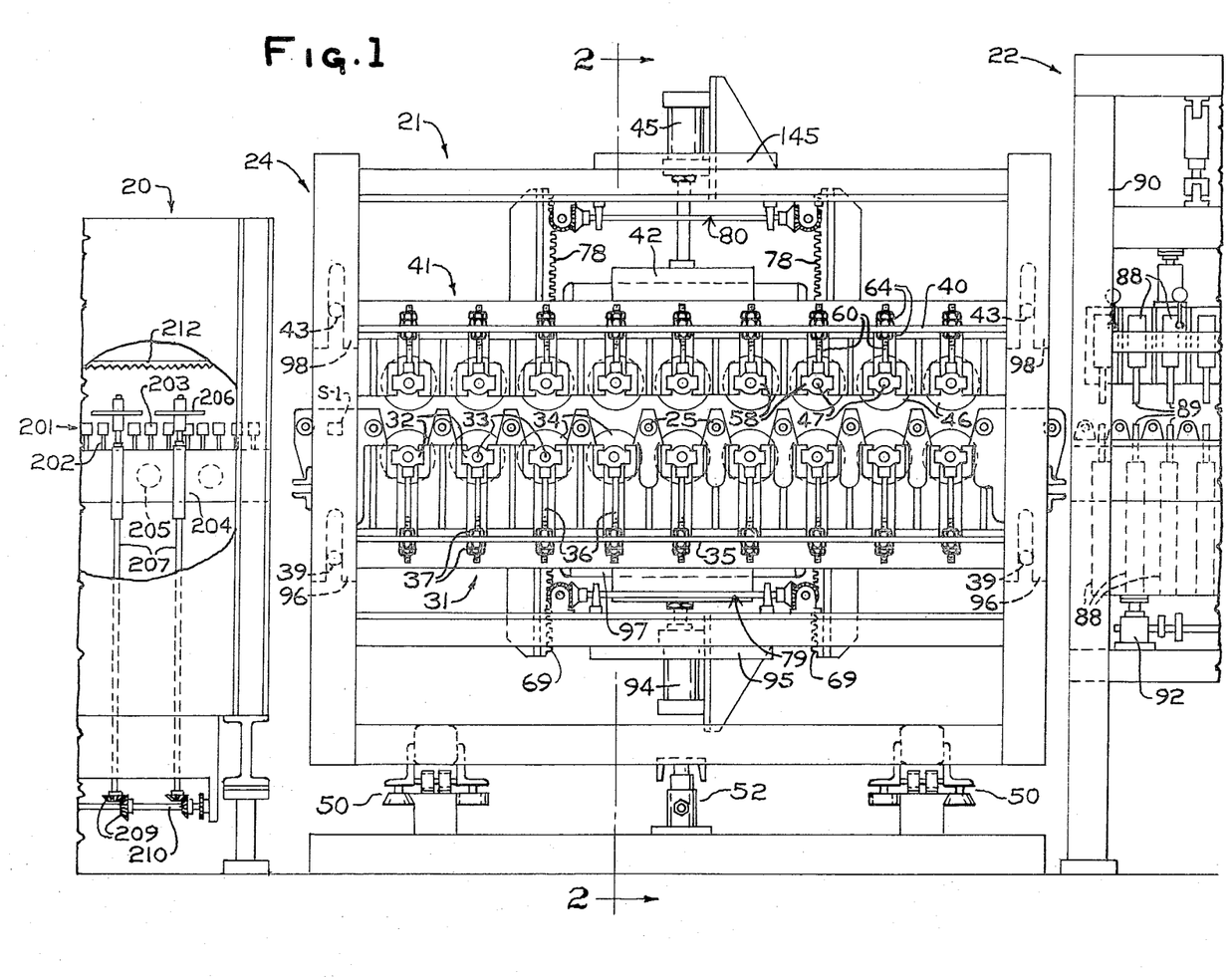
Figure 2:
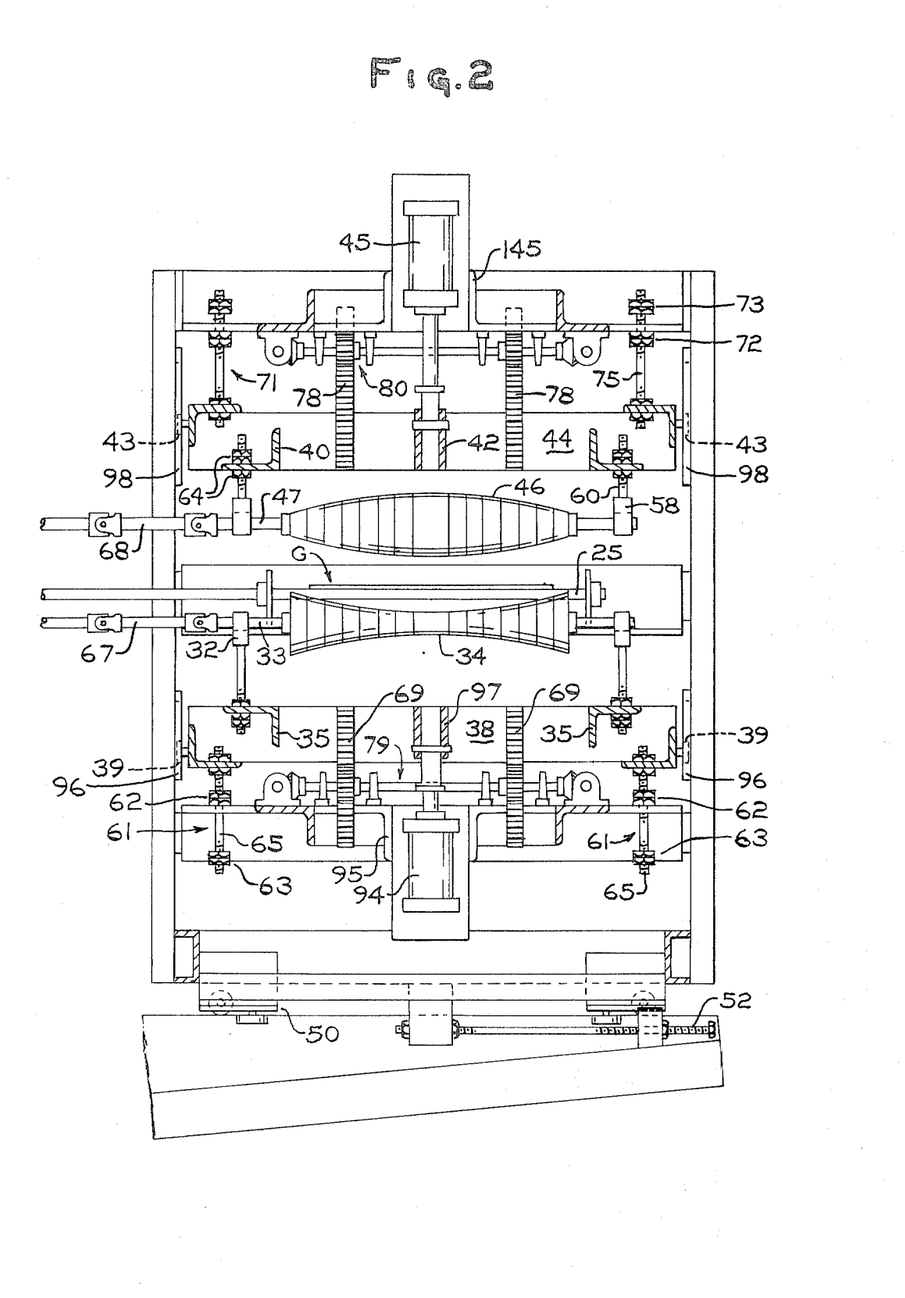
Figure 3:
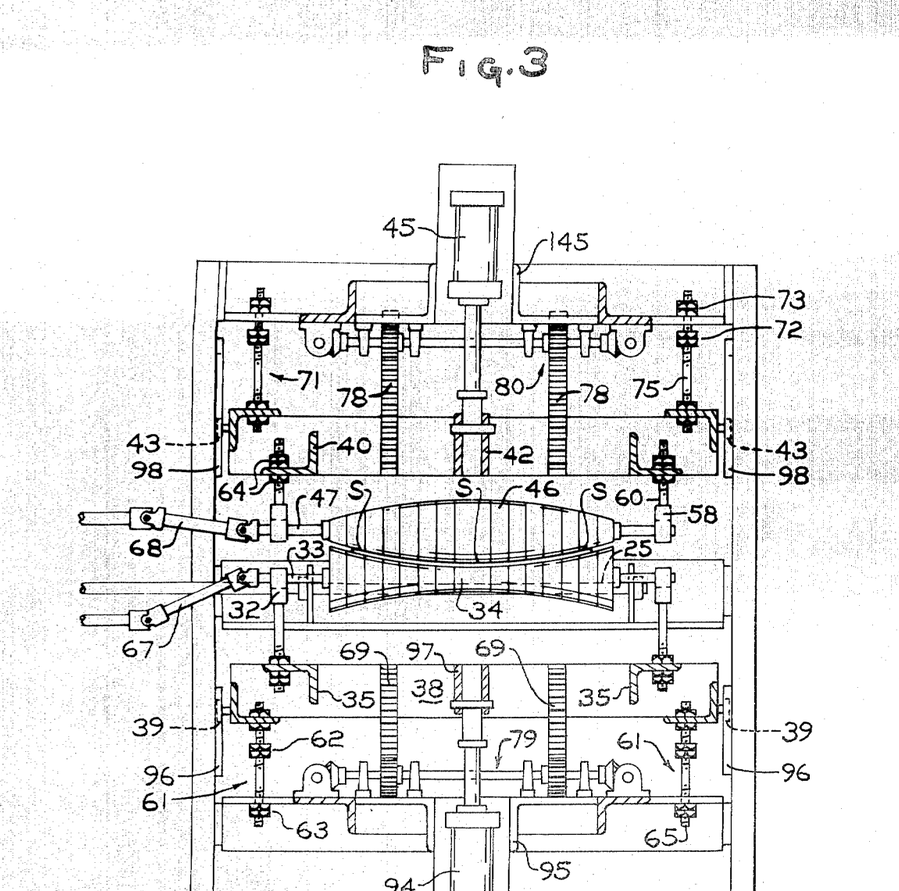

The roll forming station 21 of the present invention comprises an open reinforced frame structure 24 to which are movably supported a lower shaping roll housing 31 and an upper shaping roll housing 41. Both housings are oriented in an oblique plane extending at an angle of approximately 5° to the horizontal to be parallel to the oblique surface of the gas hearth bed in the furnace 20. The lower roll housing 31 comprises a pair of sets of vertical brackets 32, each arranged in a horizontal row to receive one or the other opposite axial ends of one of a series of straight lower common shafts 33. The brackets 32 on the right side of FIGS. 2 and 3 are disposed in spaced positions along a horizontal plane lower than the horizontal plane along which the horizontal line of brackets to the left of FIGS. 2 and 3 are disposed. Thus, the series of common shafts 33 are capable of alignment with one another in a plane parallel to the plane of support provided by the gas hearth bed in the tunnel-like furnace.

Each of the lower common shafts 33 rotatably supports one of a series of lower segmented shaping rolls 34. Each segment of the segmented rolls 34 is 2 inches in axial length except for the centermost segments which are 4 inches long. Each central shaping segment is flanked by seven flanking shaping segments.

A pair of apertured longitudinal angle members 35 are supported by the lower roll housing 31 with their apertures aligned below apertures in each of the brackets 32 to receive the lower ends of threaded shafts 36. Suitable lock nuts 37 are provided to adjust the axial position of the threaded shafts 36 relative to the angle member 35 so as to fix the position of each bracket 32 relative to the lower roll housing 31. Each angle member 35 interconnects a pair of lower end plates 38. A roller 39 is attached to each end of each lower end plate 38.

The vertical position of each bracket, as determined by adjustment of its associated threaded shafts 36, controls the position of an end of a lower common shaft 33. This establishes the orientation of the segmented rolls 34 that are mounted on the shafts 33. Each shaft 33 is straight to facilitate mounting and replacement of a segmented roll of desired configuration thereon. It is thus a simple matter to remove one set of shaping rolls conforming to one configuration and replace it with another set of shaping rolls conforming to another configuration whenever it is required to produce a different part.

The lower roll housing 31 is rigidly attached to a lower vertical piston 94 mounted on a piston support structure 95 attached to the open reinforced frame structure 24. A pair of lower vertically slotted plates 96 are carried by structure 24 for receiving the rollers 39 attached to each end plate 38 of the lower roll housing 31. A cross beam 97 is attached to the upper end of piston 94 and interconnects lower apertured angle members 35 to enable the lower roll housing 31 and its set of lower shaping rolls 34 to move in unison in response to actuation by piston 94.

The open reinforced frame structure 24 also carries two pairs of upper vertically slotted plates 98 that receive upper guide rollers 43 fixed to the ends of upper plates 44 which interconnect the opposite ends of a pair of upper apertured longitudinal angle members 40 that form part of the upper roll housing 41. The upper angle members 40 are attached to a cross beam 42 which is fixed to a free end of an upper piston 45, which is downwardly extendable. A cylinder for the piston is supported on an upper piston support structure 145 forming part of the reinforced frame structure 24.

In vertical planes intermediate the vertical planes occupied by the conveyor rolls 25 and in alignement with the vertical planes occupied by the lower set of segmented shaping rolls 34, the upper roll housing 41 supports a set of upper segmented shaping rolls 46, each comprising a plurality of segments mounted on a straight upper common shaft 47 for each upper shaping roll 46. The shape of each segment of each upper shaping roll 46 is complementary to the shape of the corresponding segment of its corresponding lower shaping roll 34.

The vertical position of each of the upper segmented rolls 46 is adjustable in a manner similar to the adjustment provided for the lower segmented rolls 34. For example, each upper shaft 47 is received rotatably in apertures in upper shaft brackets 58. The latter are rigidly connected at their upper ends to the lower ends of externally threaded rods 60. The latter extend upward through one of the apertures in one of the upper apertured longitudinal angle members 40 and are fixed in position to the latter through pairs of adjustment nuts 64 for each threaded rod, one nut being below angle member 40 and at least one nut mounted above the angle member 40 to determine the vertical position of each end of each upper common shaft 47.

As seen in FIGS. 2 and 3, the segments of the lower segmented rolls 34 form a substantially continuous concave contour in the axial direction of the straight common shaft 33. This shape conforms to the shape desired about an axis parallel to the path of glass sheets take through the roll forming station for an incremental portion of each sheet shaped by roll forming. The segments of the upper segmented rolls 46 have generally convex configurations that are complementary to the configuration of the lower roll segments they oppose. Hence, if all the upper segmented rolls 46 have their shafts 47 in alignment in an upper oblique plane and the lower segmented rolls 34 have their shafts aligned in a lower oblique plane, when piston 94 is extended upwardly, segmented rolls 34 are lifted to an oblique plane above the oblique plane occupied by the conveyor rolls 25 and non-aligned portions of the upper and lower surfaces of the different increments of a flat glass sheet moving through the roll forming station are simultaneously engaged by the different pairs of rotatable rolls to impose bending forces on different increments of the traveling sheet simultaneously.

The composition of the roll segments is very important to insure proper operation of the roll forming apparatus with minimum glass breakage or glass marking. The material must have low thermal conductivity to minimize thermal shock on the hot glass when the latter engages the relatively cold shaping rolls. The rolls must have a low coefficient of thermal expansion over a wide temperature range of approximately 600°F. from room temperature to an elevated temperature that the rolls attain on contacting the hot glass. They must be of a composition that does not react chemically with glass, that is durable over said wide temperature range, and is readily shaped or machined to complex contours.

To meet these requirements, the upper segmented shaping rolls 46 and the lower segmented shaping rolls 34 are composed of an asbestos cement sold by Johns Mansville under the trademark of TRANSITE. Furthermore, each of the segments is separated by a low-friction washer having a thickness of approximately one-sixteenth inch.

In order to minimize marking of the glass surface due to rubbing by portions of the shaping rolls whose peripheral velocity differs sufficiently from the speed of the sheet moving through the roll pressing apparatus to cause observable rubbing marks, only selected segments of the segmented shaping rolls 34 are keyed to lower shafts 33 to rotate therwith and the remaining segments of the lower shaft are freely rotatable. The same is true of the keying of selected segments of the upper segmented shaping rolls 46 to upper shafts 47.

Suitable driving means is provided to rotate conveyor rolls 25 and the keyed segments of shaping rolls 34 and 46 at the same peripheral speed. Conveyor rolls 25 are directly connected to a main drive shaft (not shown). Shafts 33 and 47, which rotatably support the shaping rolls 34 and 46, respectively, are connected to their respective drive shafts through flexible coupling means 67 and 68.

The entire open frame structure 24 is mounted on transverse guides 50 for transverse movement by adjustment means 52.

In order to insure proper alignment between upper roll housing 41 and lower roll housing 31 when there is relative movement therebetween, each housing has an alignment mechanism. The alignment mechanism for lower roll housing 31 comprises four racks 69 extending downward from housing 31 to mesh with certain gears of a rectangular array 79 of lower horizontal connecting rods and gears connected to frame structure 24. A similar arrangement of racks 78 extend upward from upper roll housing 41 to mesh with certain gears of an upper array 80 of rods and gears also fixed to frame structure 24 to align the upper roll housing 41.

In the cooling or quenching station 22, cooling air is delivered through upper and lower nozzle boxes 88 which terminate in elongated nozzles 89 having arcuate openings conforming to the shape of the glass sheets conveyed through the cooling or quenching station 22. A skeleton structure 90 supports the nozzle boxes 88.

Adjusting means 92 is provided to adjust the position of nozzle boxes 88 relative to the supporting structure 90 and the path taken by glass sheets through the cooling or quenching station 22.

If the upward movement of the lower set of shaping rolls 34 toward the upper set of shaping rolls 46 is allowed to reach a position where the roll sets are separated from one another by a distance equal to the glass sheet thickness, each upper set of shaping rolls 47 engages the upper glass sheet surface along lines aligned with lines along which the corresponding shaping rolls 34 of the lower set engage the lower glass sheet surface. The present invention has determined that this simultaneous opposing rolling engagements of the opposite glass surfaces along aligned lines is an important cause of surface marking on the glass surfaces.

In order to minimize surface marking due to simultaneous rolling engagement by opposed shaping rolls, the present invention teaches the roll forming art the advisability of avoiding too close adjacency between corresponding shaping rolls of the upper set and of the lower set. In the illustrative embodiment of apparatus for performing the method according to the present invention, the lower shaping roll housing 31 is provided with lower stop members 61 and the upper shaping roll housing 41 is provided with upper stop members 71.

Each of the lower stop members 61 comprises a lower limit adjustment means 62 and an upper limit adjustment means 63 in the form of lock nuts adjustably mounted on one of a plurality of lower threaded shafts 65. The latter is rigidly secured at its upper end to the lower shaping roll housing and extends through an aperture in a lower cross member of the open reinforced frame structure 24 with lower limit adjustment means 62 disposed above the lower cross member and upper limit adjustment means 63 disposed below the cross member. Each of the upper stop members 71 comprises an upper limit adjustment means 72 and a lower limit adjustment means 73 in the form of lock nuts adjustably mounted on one of a plurality of upper threaded shafts 75. The latter is rigidly secured at its lower end to the upper shaping roll housing 41 and extends through an aperture in a higher cross member of the open reinforced frame structure 24 with upper limit adjustment means 72 disposed below the higher cross member and the lower limit adjustment means 73 disposed above the higher cross member.

According to the present invention, the lower limit adjustment means 73 of the upper shaping roll housing 41 and the upper limit adjustment means 63 of the lower shaping roll housing 31 are adjusted according to the thickness of glass sheets G undergoing roll forming so that the minimum spacing between corresponding shaping rolls in the direction of glass sheet thickness exceeds the glass sheet thickness by a predetermined amount. This amount is based on the tolerance permitted by the customer and is usually between about 0.01 inch and 0.05 inch, preferably 0.02 inch to 0.04 inch. For example, when the customer tolerance for a particular part permits the shape to deviate by 0.04 inch from the desired shape, the lower stop member 61 and the upper stop members 71 are adjacent to limit the closest adjacency of corresponding shaping rolls to a distance in the direction of glass sheet thickness equal to the sum of the glass sheet thickness plus 0.03 inch.

FIGS. 2 and 3 show the roll forming apparatus in the limits of the movement allowed for the upper shaping roll housing 41 and the lower shaping roll housing 31. In FIGS. 2, the upper shaping rolls 46 are retracted upward to their uppermost positions permitted by upper stop members 71 while the lower shaping rolls 34 are retracted downward to their lowermost positions permitted by lower stop members 61. These positions provide sufficient clearance between the spaced shaping rolls to receive a glass sheet for roll forming. In FIG. 3, the shaping roll housings are shown in their positions of closest adjacency permitted by stop means 61 and 71. The same positions for the shaping rolls are shown in larger scale in FIG. 7. Note a space S remains between the upper surface of the glass sheet and upper shaping roll 46 in this drawing.

FIGS. 4 to 8 show different successive phases during a typical roll forming operation. The upper shaping rolls 46 occupy the position shown in FIG. 3 while the lower shaping rolls 34 are retracted to the position of FIG. 2 as a glass sheet G passes over the glass sensing device S-1 as it enters the roll forming station. When the trailing edge of the glass sheet G passes by the glass sensing device S-1, the lower piston 94 extends the lower shaping roll housing 31 upward so that by the time the portion of the roll forming cycle depicted in FIG. 4 arrives, each longitudinal side edge portion of the glass sheet has been engaged in rolling support by an outer segment of lower segmented shaping rolls 34 along one of a series of spaced lines A1 or A2 along the lower surface of the glass sheet near the laterally outer ends of the latter relative to the path of glass movement. Since the glass is heat softened, its center portion remains with its bottom surface partly supported in rolling engagement with conveyor rolls 25, while the portions of the bottom surface intermediate the center portion partly supported in rolling engagement with conveyor rolls 25 and the transverse end portions partly supported in rolling engagement with transverse outer segments of lower shaping rolls 34 bridge the spaces between the spaced lines of rolling support by conveyor rolls 25 and the spaced lines of rolling support by the transverse outer segments of lower shaping rolls 34 that have risen to positions above the plane occupied by the upper portions of the rotating conveyor rolls 25.

By the time the roll forming cycle has reached the point in the cycle depicted in FIG. 5, the lower shaping rolls 34 have lifted the glass sheet G to an extent such that the center portion of the upper surface of the sheet makes rolling contact against the center segment of the upper shaping rolls 46 along transverse lines B longitudinally spaced along the path of sheet movement while the spaced lines of rolling support A1 and A2 along the lower surface of the glass sheet G against the set of lower shaping rolls 34 have lengthened laterally inward somewhat and the glass sheet G has ben lifted completely out of contact with the conveyor rolls 25. The combination of the rolling engagement of the spaced lines B of the center portion of the upper surface of the glass sheet against the central segments of upper shaping rolls 46 with the rolling support of the transverse outer portions of the glass sheet G on the outer segments of lower shaping rolls 34 provides a bending force on the heat-softened glass sheet as the lower shaping rolls 34 continue to move upward in unison.

Figure 7:
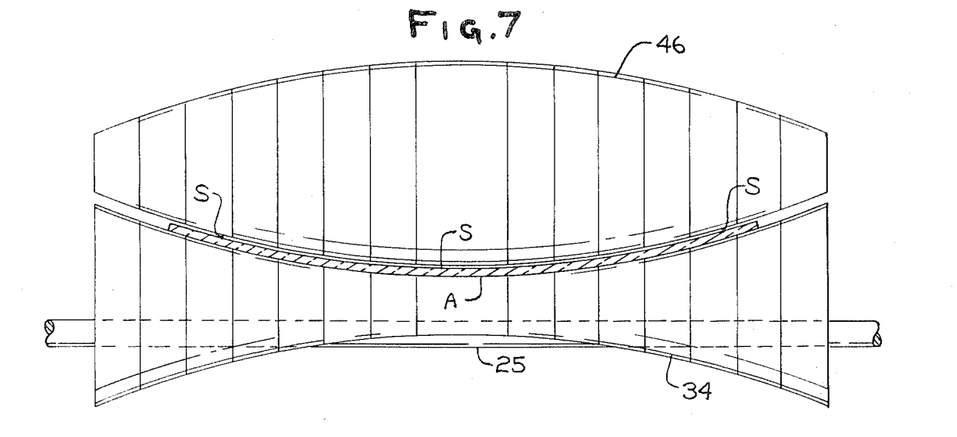

The spaced lines B of rolling engagement between the central portion of the upper surface of the glass sheet against the upper shaping rolls 46 extend outward in both directions from the original point of rolling engagement as the lines A1 and A2 of rolling support of the lower shaping rolls 34 against the transverse end portions of the glass sheet extend inwardly from the initial points of rolling support as a result of the bending force produced by continued upward movement of the lower shaping rolls 34 toward the corresponding upper shaping rolls 46 through the stage of the roll forming cycle depicted in FIG. 6. Were it not for the present invention, one or both of the pistons 94 and 45 would continue to provide relative motion of the sets of shaping rolls toward one another until lines B of rolling engagement against the upper surface of the sheet extend completely across said supper surface while the spaced lines A1 and A2 of rolling support along the bottom surface merge to form spaced transverse lines A of rolling support extending from edge to edge of the sheet. The present invention teaches those skilled in the art to adjust the stop members 61 and 71 so that the pistons 94 and 45 are unable to move the respective shaping rolls 34 and 46 closer to each other than a predetermined distance slightly greater than the glass sheet thickness in order to prevent simultaneous opposing engagement of the shaping rolls 34 and 46 against the opposite glass sheet surfaces along spaced lines of engagement aligned through the glass sheet thickness. Therefore, when the sets of shaping rolls 34 and 46 reach the positions permitted by stop members 61 and 71, respectively, the spaced lines B of rolling engagement against the upper surface of the glass sheet are offset from the spaced lines A1 and A2 of rolling support for the bottom surface of the glass sheet and the moving glass sheet G sags away from the center portions of the upper shaping rolls 46 and into rolling support by the center portions of lower shaping rolls 34. FIG. 7, like FIG. 3, shows the newly roll formed glass resting entirely on lower shaping rolls only, but is of sufficiently larger scale to show a space S between the glass sheet G and the upper shaping rolls 46 at this stage of the process.

Figure 8:
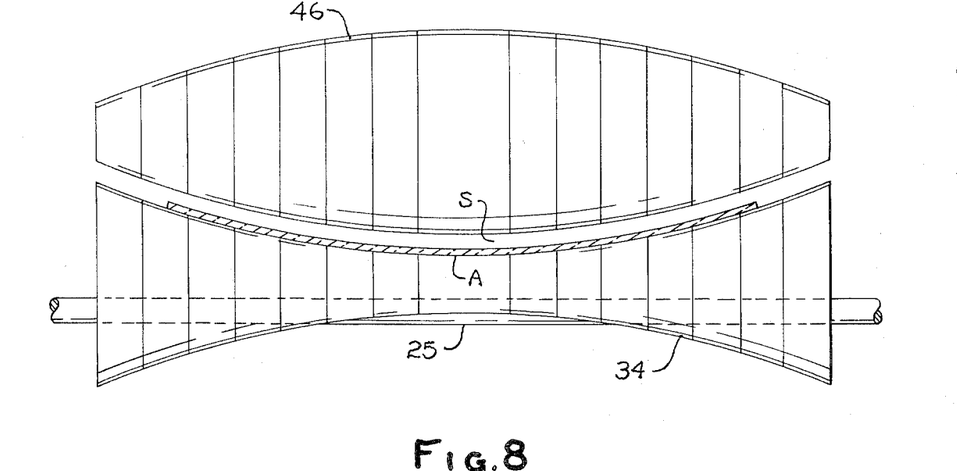

Once the glass sheet has been shaped by roll forming, the upper piston 45 is retracted to retract the upper set of shaping rolls 46 and allow the shaped glass sheet G to be conveyed in rotatable support on the lwoer set of shaping rolls 34 to the cooling or quenching station 22. FIG. 8 shows this step of the roll forming cycle.

When the shaped glass roll forming station 21, the upper set of shaping rolls 46 is lowered by extension of upper piston 45 to the upper shaping roll position of FIG. 3 and the lower set of shaping rolls 34 are lowered by retraction of lower piston 94 to the lower shaping roll position depicted in FIG. 2 to receive the next glass sheet.

A typical roll forming apparatus has conveyor rolls 25 spaced 8 inches apart along the path of glass travel. Shaping rolls are spaced in planes equi-distant from adjacent conveyor rolls in the roll forming station.

While it is desirable to eliminate entirely the simultaneous alignment of the lines of rolling engagement of the opposite sets of shaping rolls against the opposite glass sheet surfaces, it is understood that certain patterns are difficult to shape within tolerance limits without some momentary alignment of the rolling lines of engagement against the opposite surfaces. Under such circumstances, the present invention makes it possible to minimize the duration of the simultaneous opposing rolling engagements and also to limit the length of the aligned portions of rolling lines of engagement that cannot be avoided completely.

To illustrate, a glass sheet 24 inches wide and 0.220 inches thick shaped to a cylindrical bend having a 41 inch radius of curvature develops a depth of bend of approximately 1 ¾ inches. Assuming a tolerance of 0.06 inch in dimension and adjustments to the stop members to allow a minimum separation between corresponding shaping rolls of the total of glass sheet thickness plus 0.04 inch, a minimum space of 0.26 inch in the direction of glass sheet thickness exists between corresponding shaping rolls. In the absence of the present invention, the glass sheet would be subjected to moving lines of aligned rolling engagement 8 inches apart and 24 inches long (or extending across the full width of the sheet). By providing an increase in minimum separation of 0.04 inch between corresponding shaping rolls, there is only momentary opposing alignment of rolling engagements along very short lines of alignment when the bending force is applied. Furthermore, since the glass is sufficiently heated to sag by gravity, it tends to sag toward the lower set of shaping rolls 34 before the laterally inward extending portions of the rolling lines of support along the lower glass surface provided by the lower shaping rolls 34 become aligned with the laterally outwardly extending portions of the rolling lines of engagement of the upper shaping rolls 46 against the upper glass sheet surface. The space S between the corresponding shaping rolls in the glass engaging position allows this sagging of the intermediate portions of the glass sheet to take place rather than have the glass sheet develop undesired surface marking.

The main purpose of this invention is to avoid marking due to excessive simultaneous rolling engagement of shaping rolls against aligned portions of opposite surfaces along axes of alignment that extend through the glass sheet thickness. Misalignment of the lines of rolling contact provides a bending force that helps shape the glass by roll forming and should be used when the roll forming apparatus has an arrangement of shaping rolls reversed from that of the previously described embodiment with a set of shaping rolls of concave configuration disposed over a set of shaping rolls of convex configuration complementary to the configuration of the concave rolls. Roll marking is considerably reduced when any simultaneous rolling engagement along spaced lines of contact on one surface is offset from the rolling engagement along spaced lines of contact on the other surface such as described for the illustrative embodiment of this invention.

The form of the invention shown and described in this disclosure represents an illustrative preferred embodiment and several variations thereof. It is understood that the present invention need not be limited to improving the operation of the roll pressing apparatus of U.S. Pat. No. 3,701,644 to Robert G. Frank, but may be used to improve the operation of other roll pressing apparatus, for example, that of U.S. Pat. No. 3,545,951 to Maurice Nedelec. It is also understood that other changes may be made without departing from the gist of the present invention as defined in the claimed subject matter which follows.

I claim:

1. A method of shaping deformable sheets by a roll forming method comprising moving a flat sheet while said sheet is at its deformation temperature between a pair of opposed sets of rotatable shaping rolls having complementary shaping surfaces and disposed one set above the other set when the sets are separated sufficiently to provide clearance for the entry of said flat sheet between said sets, and when said flat sheet is moving between said sets, providing relative movement between said sets toward one another until one of said sets of shaping rolls rotatably engages a portion of one surface of said sheet intermediate its opposite edges and the other of said sets of shaping rolls rotatably engage a portion of the other surface of said sheet along its opposite edge portions, whereby said relatively moving sets apply a bending force tending to shape said sheet into conformity with said complementary shaping surfaces, discontinuing said relative movement of said sets toward one another to discontinue the application of said bending force when said sets reach a position where they are separated by a predetermined distance slightly more than the thickness of said glass sheet, continuing to move said sheet between said sets, disengaging said sheet from the set disposed above the other set to support said sheet on said other set in rolling engagement therewith, providing relative movement between said sets to separate said sets, and removing said shaped sheet from between said sets before it cools below an elevated temperature sufficient to impart at least a partial temper by subsequent rapid cooling.

2. A method as in claim 1, wherein said deformable sheets are a series of flat glass sheets, further including the step of heating said series of flat glass sheets to the glass deformation temperature prior to moving the leading sheet of said series into position between said pair of opposed sets of rotatable shaping rolls, providing relative movement between said sets toward one another while said leading sheets is moving between said sets to provide simultaneous rotatable engagements of said sets against each of the opposite glass sheet surfaces along several lines of rotatable engagement extending transverse to the direction of glass sheet movement and that are misaligned from surface to surface, discontinuing said rotatable engagement of at least one of said sets against said surface rotatably engaged by said set before said lines of engagement extend transversely to where a sufficient portion of said lines of engagement against one of the glass sheet surfaces becomes aligned through the glass thickness with a portion of said lines of engagement against the other glass sheet surface to cause surface marking in the region of said alignment, removing said sheet from between said sets of shaping rolls before said glass sheets cool to below the strain point of the glass, and providing relative movement between said sets to a retracted position to provide clearance for entry of the next successive glass sheet in said series between said sets.

3. A method as in claim 2, wherein said one set of shaping rolls disposed above the other set comprises shaping rolls having convex curvatures and said other set of shaping rolls comprises shaping rolls having concave curvatures,
- further including initially lifting said leading glass sheet along its opposite edge portions by said other set of shaping rolls while the latter rotate to provide rolling engagement to convey said glass sheet between said sets of shaping rolls,
- rotating said one set of shaping rolls to rotatably engage the upper surface of said glass sheet intermediate its opposite edges, said offset rolling engagements applying bending force to said sheet, and
- sagging said sheet away from said one set of shaping rolls into rotatable engagement by said other set of shaping rolls in the portions intermediate said opposite edge portions lifted by said other set before both of said sets apply rolling engagement against both surfaces of said glass sheet from edge to edge thereof.

4. The method as in claim 3, wherein said glass sheets are supported in spaced relation between said sets of shaping rolls when they are moved into position between said sets of shaping rolls.

5. A method as in claim 1, wherein said sheet is supported in an oblique plane while moved between said sets of rotating shaping rolls.

* * * * *

UNITED STATES PATENT OFFICE
CERTIFICATE OF CORRECTION

Patent No. 3,856,499     Dated December 24, 1974

Inventor(s) Robert G. Frank

It is certified that error appears in the above-identified patent and that said Letters Patent are hereby corrected as shown below:

Claim 1, line 15, "engage" should be --engages--

Claim 2, line 8, "sheets" should be --sheet--

Claim 4, line 1, "The" should be --A--

Signed and sealed this 17th day of June 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,856,499    Dated December 24, 1974

Inventor(s) Robert G. Frank

It is certified that error appears in the above-identified patent and that said Letters Patent are hereby corrected as shown below:

Claim 1, line 15, "engage" should be --engages--

Claim 2, line 8, "sheets" should be --sheet--

Claim 4, line 1, "The" should be --A--

Signed and sealed this 17th day of June 1975.

(SEAL)
Attest:

RUTH C. MASON
Attesting Officer

C. MARSHALL DANN
Commissioner of Patents
and Trademarks